(12) United States Patent
Gentile et al.

(10) Patent No.: US 12,050,847 B2
(45) Date of Patent: Jul. 30, 2024

(54) COMPUTER-IMPLEMENTED CIRCUIT SCHEMATIC DESIGN

(71) Applicant: Circuit Mind Limited, London (GB)

(72) Inventors: Basilio Gentile, London (GB); Robert Kirberich, London (GB); Péter Udvardi, London (GB); Gary Chambers, London (GB); Mohammed Abdullah, London (GB); Robert Hardwick, London (GB); Alex Stapleton, London (GB); Tomide Adesanmi, London (GB)

(73) Assignee: CIRCUIT MIND LIMITED, London (GB)

( * ) Notice: Subject to any disclaimer, the term of this patent is extended or adjusted under 35 U.S.C. 154(b) by 154 days.

(21) Appl. No.: 17/570,294

(22) Filed: Jan. 6, 2022

(65) Prior Publication Data

US 2023/0214561 A1 Jul. 6, 2023

(51) Int. Cl.
| | |
|---|---|
| *G06F 30/30* | (2020.01) |
| *G06F 30/31* | (2020.01) |
| *G06F 30/33* | (2020.01) |
| *G06F 30/337* | (2020.01) |
| *G06F 111/20* | (2020.01) |
| *G06F 115/12* | (2020.01) |

(52) U.S. Cl.
CPC ............. *G06F 30/31* (2020.01); *G06F 30/33* (2020.01); *G06F 30/337* (2020.01); *G06F 2111/20* (2020.01); *G06F 2115/12* (2020.01)

(58) Field of Classification Search
None
See application file for complete search history.

(56) References Cited

U.S. PATENT DOCUMENTS

| | | | |
|---|---|---|---|
| 8,661,376 B2 * | 2/2014 | Yoshimura | G06F 30/30 716/101 |
| 10,061,881 B2 * | 8/2018 | Li | G06F 30/30 |
| 10,853,540 B2 * | 12/2020 | Feldman | G06F 30/32 |
| 11,354,471 B2 * | 6/2022 | MacRae | G06F 30/31 |

(Continued)

OTHER PUBLICATIONS

R. Ramesh et al. "Turning coders into makers: the promise of embedded design generation", Proceedings of the 1st Annual ACM Symposium on Computational Fabrication, Jun. 12, 2017 (Jun. 12, 2017), pp. 1-10, XP055902818, DOI: 1031145/3083157.3083159.

(Continued)

*Primary Examiner* — Leigh M Garbowski
(74) *Attorney, Agent, or Firm* — Rivka Friedman (57) ABSTRACT

A computer-implemented method of designing at least a portion of an electronic circuit schematic is described herein. The method comprises receiving requirements for an electronic circuit or at least a portion of an electronic circuit, creating a set of variables and constraints based on the requirements for the electronic circuit, wherein the constraints limit the possible value that may be assigned to the variables, assigning values to the variables using a solver such that the values of the variables satisfy the constraints, and outputting at least a portion of a designed electronic circuit schematic or circuit schematic specification that meets the requirements for the electronic circuit based on the assigned values of the variables.

17 Claims, 7 Drawing Sheets

(56) References Cited

U.S. PATENT DOCUMENTS 11,354,477 B1 * 6/2022 Ahuja ................. G06F 30/3953
2020/0380188 A1 * 12/2020 MacRae ................ G06F 30/327

OTHER PUBLICATIONS

Lin Richard et al: "Polymorphic Blocks: Unifying High-level Specification and Low-level Control for Circuit Board Design", Proceedings of the 33rd Annual ACM Symposium on User Interface Softward and Technology, Oct. 20, 2020 (Oct. 20, 2020), pp. 529-540, XP058726796, DOI: 10.1145/3379337.3415860.

Lin Richard et al: "Supporting Circuit Design with a Block-Based, Generator Language", Proceedings of the 296th ACM International Conference on Information & Knowledge Management, Apr. 25, 2020 (Apr. 25, 2020), pp. 1-8, XP058709871, DOI: 10.1145/3334480.3382887.

Otte, Lea. CELUS White Paper—Workflow on the CELUS Engineering Platform [online], [retrieved at least as early as Jan. 5, 2022]. Retrieved from the Internet < https://pages.celus.io/whitepaper_product_workflow_overview >.

* cited by examiner

COMPUTER-IMPLEMENTED CIRCUIT SCHEMATIC DESIGN

FIELD OF THE INVENTION

The present disclosure relates to computer-implemented schematic circuit design.

BACKGROUND

In a typical circuit schematic design process, an engineer will begin with a high-level understanding of input, processing and output. Based on this, they will then decide high-level architectural, functional and other requirements. This would typically comprise a functional block diagram of the main functional blocks, modules or subsystems of a circuit, with connections drawn between blocks/modules/subsystems. A typical small example might be a block representing a microcontroller connected to a block representing an accelerometer and a block representing a display. Additionally, a block representing a battery pad might connect to a block representing a power converter which in turn has connections to the other blocks.

The next step is to find a set of electronic parts among tens of thousands of options so that they satisfy the functional requirements of each of the blocks, and at the same time are compatible with each other. The latter means that the parts have the necessary interfaces and pins to connect with each other, but also that the properties of those interfaces and pins are compatible with each other. For example, a microcontroller which has only a SPI communication interface is not compatible with an accelerometer which has only an I2C communication interface. A power converter will also need to be chosen so that its voltage and current can power the remaining components. Furthermore, the engineer may want to optimise the selection of compatible parts in terms of priorities like total cost, or size, or power usage, efficiency, reliability, tolerance, or some combination of the above.

Having inspected the parts, determined their compatibility, and evaluated their optimality against the relevant priorities, the engineer will then need to create a schematic, thereby detailing the pin-to-pin connections of the parts, and including ancillary parts required to support the main parts (e.g., pull-down resistors, decoupling capacitors, etc).

Whilst the above example is small, it already illustrates some of the complications that may arise in the design process. When the problem is large, for example, involving many different functional blocks, many different candidate parts that may be suitable for those functional blocks, a wide variety of interfaces and configuration issues, and complications arising from voltage and current constraints (amongst other things), then designing a feasible or optimal circuit can be a difficult, time-consuming, and error-prone process. Nevertheless, the above is a common scenario in a wide variety of industries, including, but not limited to, automotive, defence, aerospace, manufacturing, industrial control, HVAC and consumer electronics. In practice, this process results in hundreds of millions of hours spent every year by electronic engineers all around the world. Consequently, an effective method to automate at least a part of the design process has the potential for considerable time and cost savings and would empower the engineer to explore ideas in a way that has hitherto not been possible.

Attempts are being made to alleviate some of the challenges described above. CELUS, a software company based in Munich, Germany, is developing a product which they describe in their marketing literature (for example a white paper: "Workflow on the CELUS Engineering Platform" by Lea Otte), where requirements specifications are being provided to the system which searches a database of parts and optimises over priorities such as physical fit to a printed circuit board, or price. JitX, a company based in Berkeley, California, has developed a programming language which is used by the electronic engineer to specify design requirements, including optimisation goals, and also design routines, where the engineer programmatically describes rules and methods they want to use to design the circuit. The system then generates a schematic and bill of materials.

Further afield in the integrated circuit design industry, electronic design automation (EDA) has been used for many years. Logical synthesis, placement of blocks, and layout examples of standard tools and techniques. However, such approaches have been directed to integrated circuit design rather than the design of discrete parts on a circuit board.

SUMMARY OF THE INVENTION

Aspects of the invention are as set out in the independent claims and optional features are set out in the dependent claims. Aspects of the invention may be provided in conjunction with each other and features of one aspect may be applied to other aspects.

In a first aspect there is provided a computer-implemented method of designing at least a portion of an electronic circuit schematic. The method comprises receiving requirements for an electronic circuit or at least a portion of an electronic circuit, creating a set of variables and constraints based on the requirements for the electronic circuit, wherein the constraints limit the possible values that may be assigned to the variables, assigning values to the variables using a solver such that the values of the variables satisfy the constraints, and outputting at least a portion of a designed electronic circuit schematic or circuit schematic specification that meets the requirements for the electronic circuit based on the assigned values of the variables.

The specification of an electronic circuit schematic resulting from assignment of values to variables, may include at least one of:
   a set of electronic parts, being a subset of the candidate parts;
   connections between the electronic parts mentioned above, where connections are specified at one or more of the following levels:
   the pin-to-pin level;
   the interface-to-interface level;
   voltage values associated with pins or interfaces;
   current values associated with pins or interfaces;
   the values associated with attributes of parts;
   the values associated with attributes of interfaces; and
   indicated values of configuration settings of parts or their interfaces.

The values of variables assigned by the solver may specify one or more of the following:
   The decision to include or exclude a particular part from the subset of candidate parts;
   The decision to include or exclude a particular connection from a particular part to another particular part;
   The decision to include or exclude a particular interface of a particular part;
   The decision to include or exclude an allocation of a particular set of pins of a particular part to the service of an interface or a constituent element of an interface;

The decision to include or exclude an allocation of a particular set of pins of a particular part to an electrically conductive element;

The decision to include or exclude an attribute of a communication protocol in the configuration of a particular interface of a particular part;

The electrical voltage or voltage limit on a particular pin of a particular part;

The electrical current or current limit on a particular pin of a particular part;

The oscillatory frequency of electrical quantities of a particular part or particular component of a particular part;

The value of an electrical or otherwise physical quantity associated with a particular part, comprising one or more of:

Resistance;
Capacitance;
Inductance;
Voltage rating;
Current rating; and
Temperature rating.

The constraints may limit or otherwise affect the solution (s) generated by the solver relating to one or more of:

The parts that will be included in the solution(s);

The connections between parts that will be included in the solution(s);

The interfaces on parts that will be included in the solution(s); and

The connections between interfaces on parts that will be included in the solution(s).

The connections between pins of different parts that will be included in the solution The voltage levels and voltage ranges present on pins on parts that will be included in the solution(s);

The current levels and current ranges flowing between pins on parts that will be included in the solution(s);

The frequency of oscillations of voltages on pins on parts that will be included in the solution(s);

The chosen configurations of protocols for interfaces on parts that will be included in the solution(s).

Creating a set of variables and constraints may further comprise creating an objective function of the variables, and wherein assigning values to the variables using a solver comprises assigning values to the variables to optimise the value of the objective function whilst satisfying the constraints.

Assigning values to the variables using a solver may comprise determining whether selected parts and connections are possible based on the created constraints and variables.

In some examples, in the event that no values can be assigned to all the variables such that they satisfy the constraints, the method comprises outputting an indication that no solution is possible.

The computer implemented method may further comprise obtaining candidate electronic parts from a library of electronic parts that may provide the desired functionality of the electronic circuit or a portion of the electronic circuit based on the requirements for the electronic circuit, and wherein the step of creating a set of variables and constraints comprises creating variables and constraints for the candidate electronic parts.

Creating a set of variables and constraints for determined candidate electronic parts may comprise ascribing a variable to each candidate electronic part and assigning values to the variables using the solver such that the values of the variables satisfy the constraints.

Obtaining candidate electronic parts may comprise creating data structures representing at least one of (i) a set of candidate electronic parts that may meet the requirements for the electronic circuit, (ii) representations of subsets of candidate electronic parts and (iii) the connections between the set of candidate electronic parts or subsets of candidate electronic parts based on the requirements for an electronic circuit, and wherein creating a set of variables and constraints are based on the created data structures.

For example, the functionality of a specific electronic part may be provided by a plurality of electronic parts. In such instances, obtaining candidate electronic parts may comprise creating data structures representing representations of subsets of candidate electronic parts, each representation of subsets of candidate electronic parts representing a respective one of the plurality of electronic parts.

Creating data structures representing at least one of (i) a set of candidate electronic parts that may provide the desired functionality of the electronic circuit or a portion of the electronic circuit, (ii) representations of subsets of candidate electronic parts, and (iii) the connections between the set of candidate electronic parts or subsets of candidate electronic parts may comprise obtaining desired functionality of the electronic circuit or a portion of the electronic circuit from the electronic requirements and generating respective filters based on the obtained desired functionality of the electronic circuit or a portion of the electronic circuit, and populating each filter with at least one candidate electronic part, a corresponding plurality of candidate electronic parts, or a subset of electronic parts, that could provide the desired functionality, and creating arcs between filters to represent potential connections between candidate electronic parts or subset electronic parts.

Each filter may have associated with it a candidate set of electronic parts selected from the library of parts.

Creating a set of variables and constraints based on the determined candidate electronic parts may comprise ascribing a variable to each arc.

Creating a set of variables, constraints and an objective function based on the determined candidate electronic parts may comprise creating a set of variables, constraints and an objective function based on at least one of (i) template variables, (ii) template constraints, and (iii) a template objective function.

The template variables, constraints and/or objective function may be stored in a database, and the method may comprise obtaining template variables, constraints and/or an objective function based on the requirements for the electronic circuit.

A template for a variable is a piece of code which may take as input either (i) the user requirements and candidate parts and/or (ii) data structures (such as filters, arcs, interfaces, etc) and then generates a set of concrete variables for the solver to take as input. The use of templates means that for each particular design problem (requirements and candidate parts), a set of variables specific to that design problem can be automatically generated. There may be templates for, amongst other things, the parts indicator variables, the arc indicator variables, the interface indicator variables, allocation (of pin mappings to electrically conductive elements) indicator variables. Furthermore, there may be templates for variables related to physical quantities such as current and voltages at interfaces, logical settings such as variables for choice of protocol configurations and addresses.

Obtaining candidate electronic parts may comprise determining functional requirements of the electronic circuit, and mapping candidate electronic parts to the functional requirements for the electronic circuit. Mapping candidate electronic parts to the functional requirements of the electronic circuit may comprise performing a lookup in a database to determine candidate electronic parts from a library of electronic parts based on at least one attribute obtained from the database. The at least one attribute obtained from the database may comprise at least one of:

a category of the electronic part based on its functionality;
possible connections of the electronic part;
the number and type of physical pins per electronic part;
the power demand or output of electronic parts;
user priorities; and
the communication interface for specific pins of specific electronic parts.

The requirements of the electronic circuit or a portion of the electronic circuit may comprise at least one of: functional requirements, non-functional requirements, and architectural requirements. Functional requirements can include requirements on power consumption, currents, voltages, frequencies, timing, communication protocols, processing, memory, and electronic part attributes, and functionalities provided by parts including, but not limited to microcontrollers, magnetometers, accelerometers, Bluetooth modules, analogue-to-digital converters, digital-to-analogue converters, air quality sensors, ambient light sensors, battery chargers, battery fuel gauges, battery holders, battery pads, motor drivers pads, buzzers, etc.

Non-functional requirements can include requirements on mechanical considerations, compliance, qualifications, approvals, rating, manufacturing process, part numbers, reliability, performance, robustness, redundancy, for example.

Architectural requirements can include connections between candidate parts or subsets of candidate parts, subdivision into subsystems, the way such sub-systems are connected together, and the signal and power lines exchanged among them, for example.

The objective function may be configured to take into account user priorities on importance of different aspects of the design. For example, the objective function may apply a weighting based on the user priorities.

The user priorities may comprise at least one of: cost; power usage; size; reliability.

The requirements for an electronic circuit may comprise at least one of: a functional block diagram; a text-based functional description; and a UML specification.

The set of constraints may comprise a set of rules defining the possible relationships and connections between electronic parts.

Obtaining candidate electronic parts may comprise determining that the functionality of the electronic circuit, a portion of the electronic circuit or a part of the electronic circuit could or should be provided by a plurality of electronic parts.

Obtaining candidate electronic parts may comprise converting a functional block, part or portion of the electronic circuit into a plurality of filters grouped together in a subcircuit. The subcircuit filters may be determined from a part being a module or subsystem comprised of functional, architectural and non-functional requirements specified in at least one of (i) the set of candidate parts and (ii) the requirements for an electronic circuit.

The method may comprise determining at least one of (i) interfaces and (ii) arcs, based on the candidate parts and requirements.

The filters contained in subcircuits may be populated with parts from candidate parts and/or subcircuits that are constructed from modules or subsystems which provide functionalities represented by the containing filter.

In another aspect there is provided a computer-implemented method of designing an electronic circuit, the method comprising: dividing the electronic circuit into portions comprising at least a first portion and a second portion; designing at least the first portion of the electronic circuit according to the method of the aspect described above; designing at least the second portion of the electronic circuit according to the method of the aspect described above, wherein the set of constraints for the second portion of the electronic circuit further comprises constraints introduced by the designed first portion of the electronic circuit.

In another aspect there is provided a computer readable non-transitory storage medium comprising a program for a computer configured to cause a processor to perform the method of any of the aspects described above.

BRIEF DESCRIPTION OF THE DRAWINGS

Embodiments of the disclosure will now be described, by way of example only, with reference to the accompanying drawings, in which.

DETAILED DESCRIPTION

Figure 1:
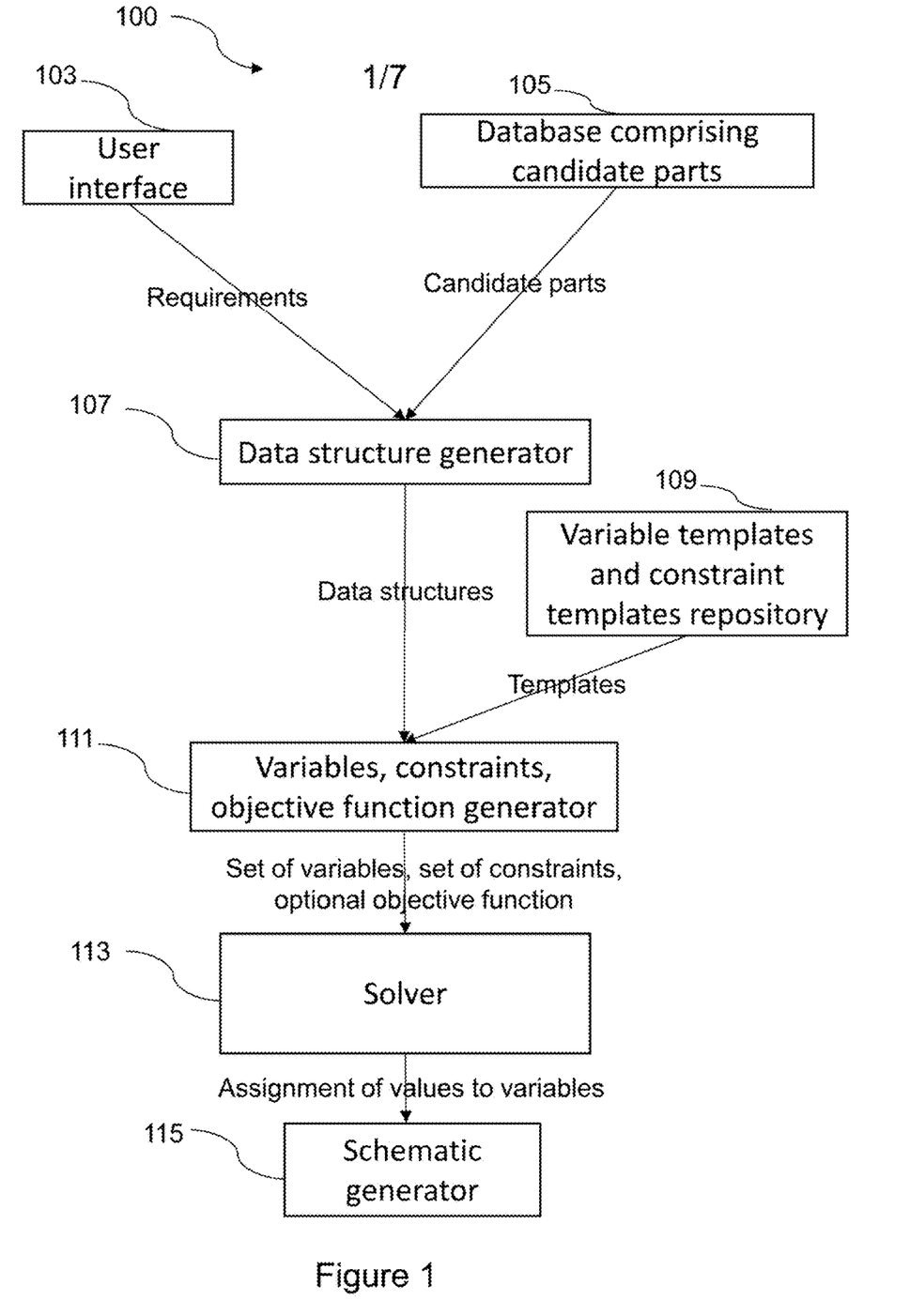
FIG. 1 shows an example functional process flow chart of how an example computer program outputs a designed circuit schematic specification or circuit schematic.

Embodiments of the claims relate to a computer-implemented method of designing at least a portion of an electronic circuit schematic. FIG. 1 shows an example functional process flow chart for designing at least a portion of an electronic circuit schematic that may be performed by a computer program, and FIG. 2 shows a functional block diagram of a portion of an example electronic circuit that may be produced according to the example process shown in FIG. 1.

Figure 2:
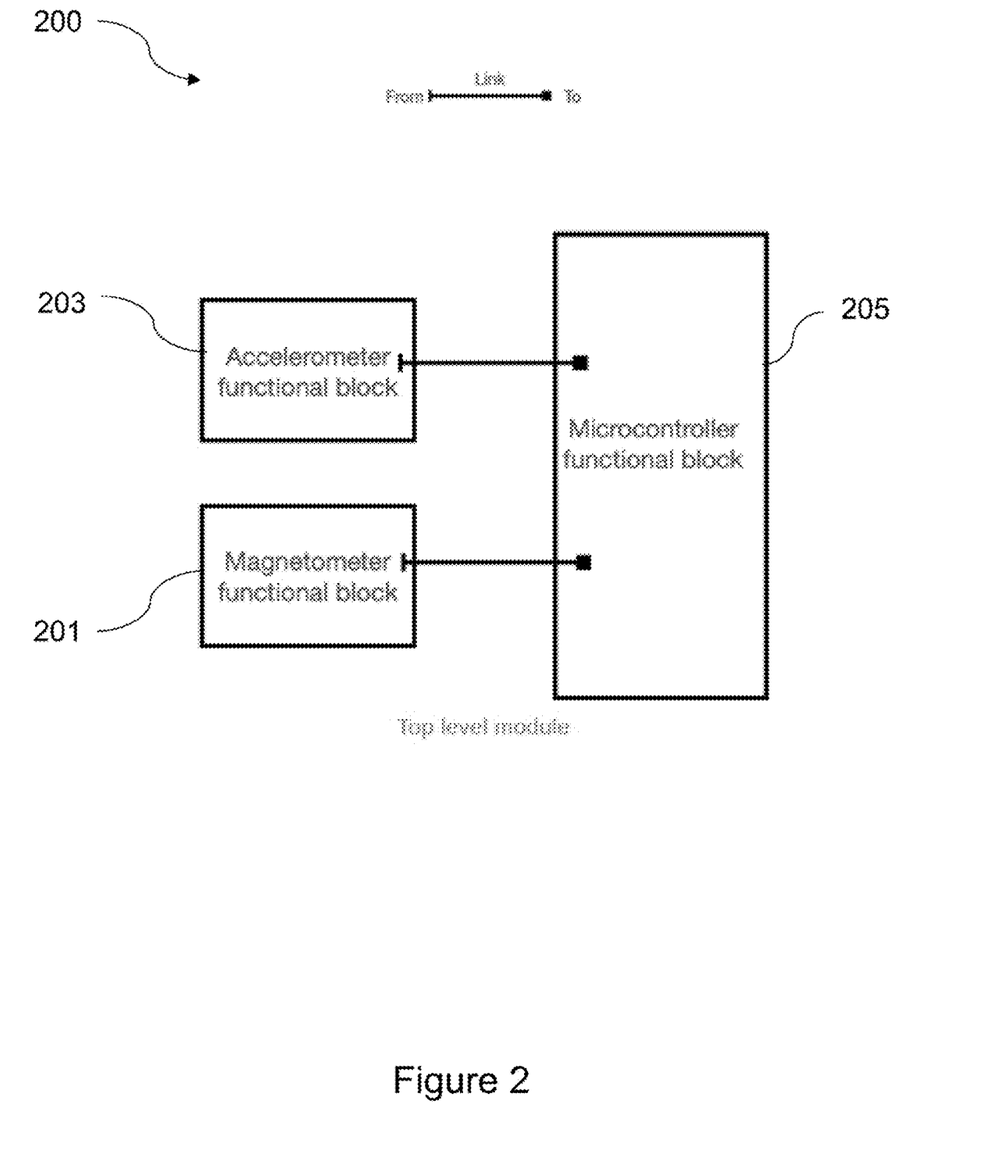
FIG. 2 shows a functional block diagram of a portion of an example electronic circuit.

The functional block diagram of FIG. 2 shows three parts of the electronic circuit represented by three functional blocks: an accelerometer functional block 203, a magnetometer functional block 201 and a microcontroller functional block 205. In this example, the functional blocks each provide a representation of a desired functionality of a respective part or component of the electronic circuit. The accelerometer 203 and magnetometer 201 are each shown as being coupled or connected to the microcontroller 205 in parallel. Each of the accelerometer, the magnetometer and the microcontroller functional blocks may be considered separate parts of the electronic circuit. A part of the electronic circuit may be considered as a part or component of the electronic circuit, for example providing a specific and/or desired functionality.

FIG. 2 shows how a user may design, in a graphical user interface, an electronic circuit according to, for example, a software design package configured to carry out the process of FIG. 1 and illustrates one example of how this may be input into a computer program configured to design at least a portion of an electronic circuit schematic. FIG. 2 therefore indicates that a user wants the functionality of both an accelerometer and a magnetometer connected in parallel to a microcontroller but does not specify specifics such as what specific electronic parts should be used for each of the accelerometer, the magnetometer or the microcontroller, nor at a practical level how the pins of each of these parts are to be connected.

Instead, embodiments of the disclosure advantageously permit these parts and their connections (for example at a pin level) to be designed automatically based on the graphical functional block diagram input by a user (or any other format that the user has expressed their requirements in, for example a text-based functional description and/or a UML specification). In this context, it will be understood that embodiments of the disclosure should not be limited to inputting a functional representation of at least a portion of an electronic circuit but rather than any other form of inputting the functional requirements of the electronic circuit may be input; for example, in the form of a text-based functional description or a UML specification.

As illustrated in FIG. 1, the computer program 100 comprises a user interface 103, a database comprising candidate parts 105, a data structure generator 107, a variable templates and constraint templates repository 109, a data structure generator 111, a solver 113 and a schematic generator 115. All of these may be modules of the computer program 100. The computer program 100 may operate on a computer system such as that described below with reference to FIG. 7.

The user interface 103 is configured to receive as an input the requirements for a portion of an electronic circuit input by the user as shown in FIG. 2. In particular, in the example of FIG. 2 the computer program 100 receives an indication from the user that they require a microcontroller functional block connected in parallel to a magnetometer functional block and an accelerometer functional block. These requirements (in this example the requirements are the functionality of a microcontroller functional block connected in parallel to a magnetometer functional block and an accelerometer functional block, although it will be understood that the requirements may comprise other requirements in addition to or instead of functional requirements) are fed to the data structure generator 107 which receives candidate parts from the database 105 by performing a lookup in the database 105 based on the requirements obtained from the user input.

The data structure generator 107 is configured to generate or create data structures 107 such as filters and arcs (described in more detail below) based on the requirements for the electronic circuit. The variables, constraints and objective function generator 111 is configured to receive these data structures from the data structure generator 107 and template variables, constraints and a cost/objective function from a variable templates and constraint templates repository 109 and create or generate a set of variables, constraints and optionally an objective function.

The solver 113 is configured to receive the generated variables, constraints and optional objective function from the variables, constraints and objective function generator 111 and assign values to the variables such that the values of the variables satisfy the constraints. The constraints limit the possible values that may be assigned to the variables and effectively comprise a set of rules defining the possible relationships and connections between electronic parts.

The schematic generator 115 is configured to receive the values of the variables from the solver 113 and is configured to output at least a portion of a designed electronic circuit schematic or circuit schematic specification that meets the requirements for the electronic circuit.

Creating a set of variables and constraints may comprise creating an objective function (sometimes also known as a mathematical cost function) of the variables and assigning values to the variables using a solver comprises assigning values to the variables to optimise the value of the objective function. Assigning values to the variables using a solver comprises determining whether selected parts and connections are possible based on the created constraints and variables. The computer program 100 may then output at least a portion of a designed electronic circuit or circuit specification that meets the requirements for the electronic circuit based on the assigned values of the variables. Alternatively, in the event that no values can be assigned to all the variables such that the constraints are satisfied the method comprises outputting an indication that no solution is possible.

A variety of known solvers may be used. Examples include COIN-OR Branch and Cut solver (CBC), Gurobi, IBM CPLEX Optimizer, and SCIP.

As described above, the computer program 100 may obtain candidate electronic parts from a library or database 105 of electronic parts that may provide the desired functionality of the electronic circuit or a portion of the electronic circuit based on the requirements for the electronic circuit, and creating a set of variables and constraints (e.g. by the variables, constraints and objective function generator 111) may comprise creating variables and constraints for the candidate electronic parts. In the example shown in FIG. 2 this comprises obtaining candidate electronic parts that may provide the functionality of a microcontroller, a magnetometer and an accelerometer. For example, this may comprise determining functional requirements of the electronic circuit, and mapping candidate electronic parts to the functional requirements for the electronic circuit. Mapping candidate electronic parts to the functional requirements of the electronic circuit may comprise performing a lookup in the database 105 to determine candidate electronic parts from a library of electronic parts based on at least one attribute (such as indicated category/functionality) obtained from the database. The at least one attribute obtained from the database comprise at least one of a category of the electronic part based on its functionality, possible connections of the electronic part, the number and type of physical pins per electronic part, the power demand or output of electronic parts, user priorities, and the communication interface for specific pins of specific electronic parts. It will be understood that one candidate electronic part may be obtained for each electronic part, or a plurality of candidate electronic parts may be obtained for each electronic part.

Creating a set of variables and constraints for determined candidate electronic parts comprises ascribing a variable to each candidate electronic part and assigning values to the variables using the solver such that the values of the variables satisfy the constraints. As such, a variable is assigned to each of the candidate microcontroller, a magnetometer and accelerometer candidate electronic parts.

Data structures representing the candidate microcontroller, magnetometer and accelerometer electronic parts that may meet the requirements for the electronic circuit and optionally the connections between the candidate electronics are generated by the computer program. The set of variables and constraints are based on these created data structures. The computer program creates the data structures and set of variables, constraints and the objective function by converting each part or functional block of the electronic circuit into a respective filter data structure and populating each filter with at least one candidate electronic part, or a corresponding plurality of candidate electronic parts that could provide the desired functionality, for example based on a lookup in the database.

A filter is a data structure used by the computer program (and optionally also held in the database, for example as an attribute of electronic parts) that represents, or contains, a candidate part, collection of candidate parts and/or subcircuits. A part or functional block specified in the input (i.e., the requirements) causes the creation of a filter. Parts/functional blocks are effectively converted to filters. Filters are so named because ultimately only one part/subcircuit will be picked from the filter for the solution.

In some examples the objective function may take into account user priorities such as cost, reliability, size, tolerance, availability, and efficiency. The user requirements may be weighted as part of the objective function.

Figure 3:
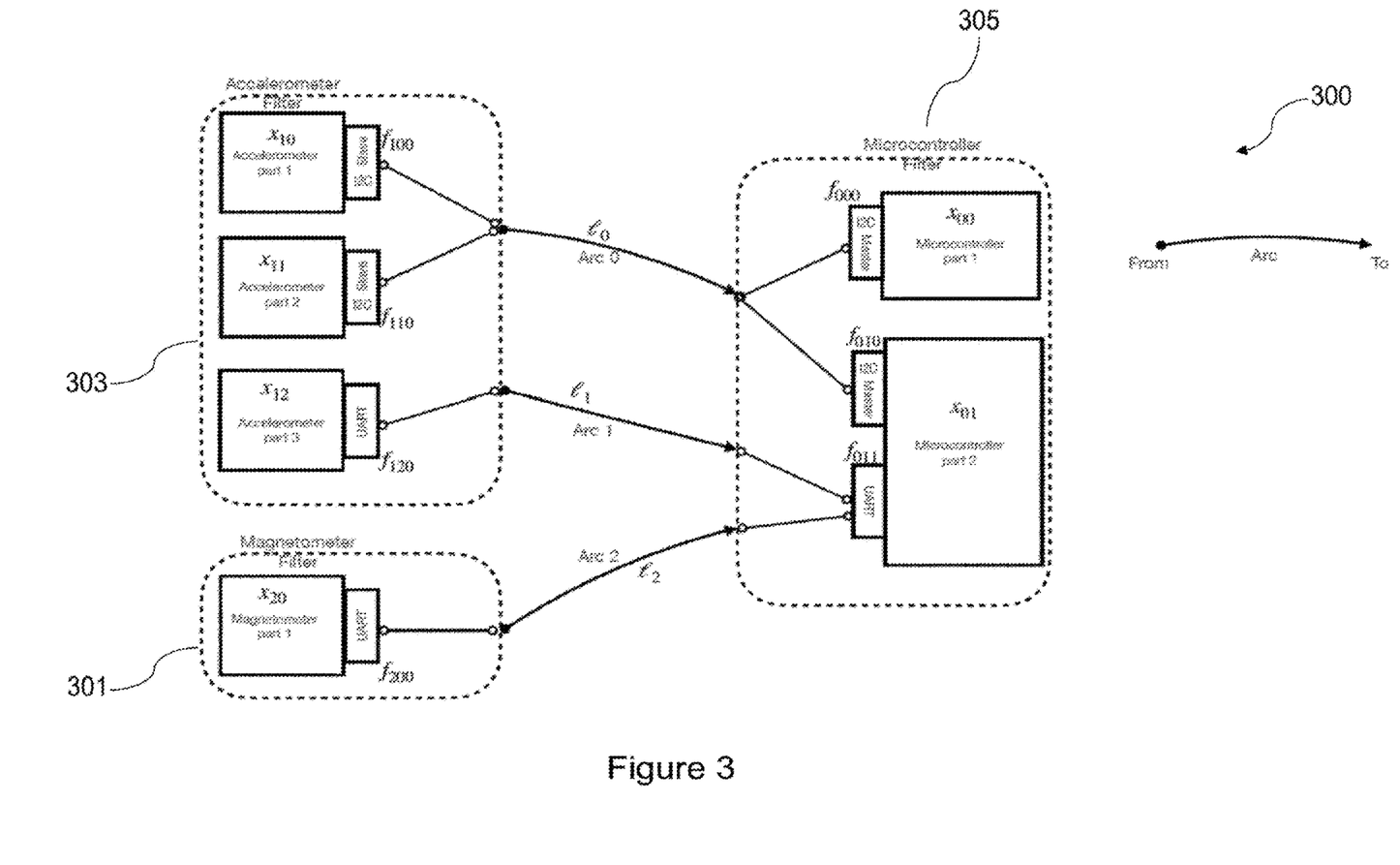
FIG. 3 shows a diagram illustrating the filters and arcs derived from the example electronic circuit of FIG. 1.

FIG. 3 shows a schematic functional diagram illustrating the filters 300 that may be applied to each part or functional block of the portion of the electronic circuit shown in FIG. 2, thereby creating a microcontroller filter 305, an accelerometer filter 303 and a magnetometer filter 301. In the example shown in FIG. 3, there are two candidate parts that may provide the functionality of the microcontroller (meaning the microcontroller filter 305 is populated by two candidate parts), there are three candidate parts for the accelerometer (meaning there are three candidate parts for the accelerometer filter 303), and one candidate part for the magnetometer (meaning there is one candidate part for the magnetometer filter 301). Therefore, it can be seen that some filters 300 may be populated by a plurality of candidate electronic parts whereas some filters 300 may be populated by a single candidate electronic part.

Arcs are then defined between filters to represent potential connections between candidate electronic parts in those filters and are data structures that represent the possible connections between the candidate electronic parts. An arc is another data structure used by the computer program that represents potential interface-to-interface connections in the solution. A link specified in the input causes one or more arcs to be created. Arcs are defined between filters; an arc has a from-filter and a to-filter. Each end of an arc is associated with a specific set of interfaces (therefore, a specific set of parts/subcircuits, since each interface belongs to a single part/subcircuit). These may be referred to as the from-interfaces and to-interfaces. An arc is chosen if and only if it is eventually matched to exactly one from-interface and one to-interface. The matchable interfaces on the from-side are all of the same interface type. The matchable interfaces on the to-side are those with interface types that are compatible with the from-interface type. For a given arc, the computer program will choose to include or not include the arc in the solution. Including the arc means matching it on both ends, which in turn implies that the matched interfaces will be physically connected.

Interfaces are the means of providing functional interaction between different parts. Interfaces have different types (see below). A given part or module/subcircuit will have a set of interfaces, each implementing an interface type. For each interface the part has, there is some combination of physical pins that can or must be used to use that interface. Parts interact on an interface-to-interface basis, i.e., there needs to be pin-to-pin connections between pins that are used for those interfaces. Interfaces can be connected together only if their interface types are compatible. An interface is composed of one or more interface pins (see below). The information relating to compatibility of interface types may be stored as an attribute in the database and may be applied as a constraint by the computer program.

Creating a set of variables and constraints based on the determined candidate electronic parts comprises ascribing a variable to each arc and assigning a value to the variable such that the constraints are satisfied. In the example shown in FIG. 3 there are three arcs; Arc 0, Arc 1 and Arc 2, each with an associated variable $l_0$, $l_1$, $l_2$. The microcontroller filter 305 comprises two microcontroller candidate parts; microcontroller part 1 is ascribed variable $x_{00}$, the microcontroller part 2 is ascribed variable $x_{01}$. The accelerometer filter 303 comprises three accelerometer candidate parts; accelerometer part 1 is ascribed variable $x_{10}$, accelerometer part 2 is ascribed variable $x_{11}$, and accelerometer part 3 is ascribed variable $x_{12}$. The magnetometer filter 301 comprises one magnetometer candidate part that is ascribed variable $x_{20}$.

In the context of this disclosure, interface types include generic digital or analogue interfaces, power source and sink interfaces, which allow power to be exchanged between parts, ground for providing a ground potential to a part standard communication interfaces such as SPI (master/slave) and I2C (master/slave), communication protocol interfaces such as SPI and I2C.

An interface is made of one or more interface pins. Interfaces of the same interface type are constituted of the same set of interface pins. For example, an interface of the I2C interface type (master and slave) are constituted of SDA (data) and SCL (clock) interface pins. It should be noted that physical pins and interface pins are different concepts. A ground interface has a single ground interface pin, though it may be mapped to multiple physical pins. This is what is referred to as a pin mapping (see below). The computer program does not have to know about all possible interfaces or interface types beforehand. As long as it has access to the data for which interface types are compatible with which other interfaces, and which (combination of) pins are used for an interface on a part (this data may be held in the database), the computer program can determine the set of usable pin mappings.

A pin mapping is an interface pin paired with a set of physical pins, i.e., it has the form (interface pin, set of physical pins). An interface pin is put into use by choosing one or more pin mappings for that interface pin. This means that the physical pins of the pin mapping are physically connected together via an electrically conducting track or wire. The set of possible pin mappings are specific to the part/module, so must be determined from external sources such as a database query. Note, in FIG. 3, power and ground interfaces are left out for clarity.

As will be described in more detail below, the computer program creates a set of variables, constraints and an objective function based on the determined candidate electronic parts and based on template variables, template constraints, and a template objective function. These templates may be stored in a database or repository such as repository 109 and the computer program may perform a lookup operation, for example based on the requirements, to obtain these template constraints.

As illustrated in FIG. 3, the computer program implements a one part per filter 300 constraint that ensures that magnetometer part 1 is chosen. For a filter i, parent(i) refers to the subcircuit containing filter i. Note the top-level filters are by convention considered in a "root subcircuit". For each filter i, if the parent subcircuit is chosen then exactly one part/subcircuit are chosen.

$$\sum_j x_{ij} = x_{parent(i)} \forall\, i$$

There is only a top-level subcircuit here, so $x_{parent(i)}=1$ for each filter i.

$X00+X01=1$ $X10+X11+X12=1$ $X20=1$

The Arc-part constraints ensure that arc 2 (which goes from the magnetometer filter 301 to the microcontroller filter 305) is chosen. If a part/subcircuit is chosen, and if that part has an interface that is the from interface of an arc, then that arc is chosen.

$l_q \geq x_{ij}\ \forall\, a, i, j \in$ from-parts/subcircuits$(q)$ $l_0 \geq x_{10}$ $l_0 \geq x_{11}$ $l_1 \geq x_{12}$ $l_2 \geq x_{20}$ The Arc-interfaces constraints ensure that the UART is chosen on Magnetometer part 1 and UART is chosen on Microcontroller part 2. An arc is chosen, if and only if exactly one of its from-interfaces is chosen.

$$\ell_q = \sum_{ijr \in from(q)} f_{ijr}\ \forall\, q$$

$l_0 = f_{100} + f_{110}$ $l_1 = f_{120}$ $l_2 = f_{200}$

An arc is chosen, if and only if exactly one of its to-interfaces is chosen.

$$\ell_q = \sum_{ijr \in to(q)} f_{ijr}\ \forall\, q$$

$l_1 = f_{000} + f_{010}$ $l_1 = f_{011}$ $l_2 = f_{011}$

An interface is chosen if and only if it is matched to at least one arc.

An interface can only be chosen if the part/subcircuit it is on is also chosen.

$f_{ijr} \leq x_{ij}\ \forall\, i,j,r$ $f_{000} \leq x_{00}$ $f_{010} \leq x_{01}$ $f_{011} \leq x_{01}$ $f_{100} \leq x_{10}$ $f_{110} \leq x_{11}$ $f_{120} \leq x_{12}$ $f_{200} \leq x_{200}$ User priorities may also be taken into account, for example, using the following constraint:

$$attr.\min \leq \sum_{ij} x_{ij} \cdot attr(i, j) \leq attr.\max\ \forall\ attr \in \{price, size, \ldots\}$$

An objective function (mathematical cost function) is created, for example according to:

$$\text{price\_weight} \cdot \sum_{b\kappa} P(b, \kappa) + z_{b\kappa} +$$

$$\text{size\_weight} \cdot \sum_{ij} S(i, j) x_{ij} - \text{power\_weight} \cdot \sum_{ij} E(i, j) x_{ij}$$

1. P(b,n) is the assumed cost of T(b,n) units of part(b).
2. S(i,j) is the assumed size of part(ij). This is determined by a process external to the invention, e.b.
3. E(i,j) is the assumed power usage of part(i,j).
The functions P(·,·), S(·,·), E(·,·) are determined by e.g. database calls.
The weighting factors price_weight, size_weight, power_weight are taken from the use input (or given default values if the user does not specify).
$z_{bk}$ is an indicator variable that indicates in this example that at least k units of part b are required to be used/purchased.
The variables, constraints and objective function are then fed into a solver known to the skilled person, such as CBC, Gurobi, CPLEX, or SCIP. A mixed integer linear programming (MLIP) solver may be sufficient.
The solution output from the solver is a set of compatible parts and the connections between them. Furthermore, the user may specify weightings in the objective function to indicate relative importance of different aspects of the objective function, for example based on user priorities. For example, if the user has specified 100% weighting on cost as a user priority, the solution generated will be the cheapest possible given the available parts and the constraints. A schematic can be drawn from this solution and/or an electronic circuit made to the solution. User priorities can include any or a combination of cost, reliability, size, tolerance, availability and efficiency.

In some examples, obtaining candidate electronic parts comprises determining that the functionality of a functional block, part or portion of the electronic circuit schematic could or should be provided by a module composed of a plurality of electronic parts. In such examples, obtaining candidate electronic parts may comprise converting at least one functional block, part or portion of the electronic circuit into a plurality of filters grouped together as a subcircuit. Such an example is illustrated in FIGS. 4 and 5.

Figure 4:
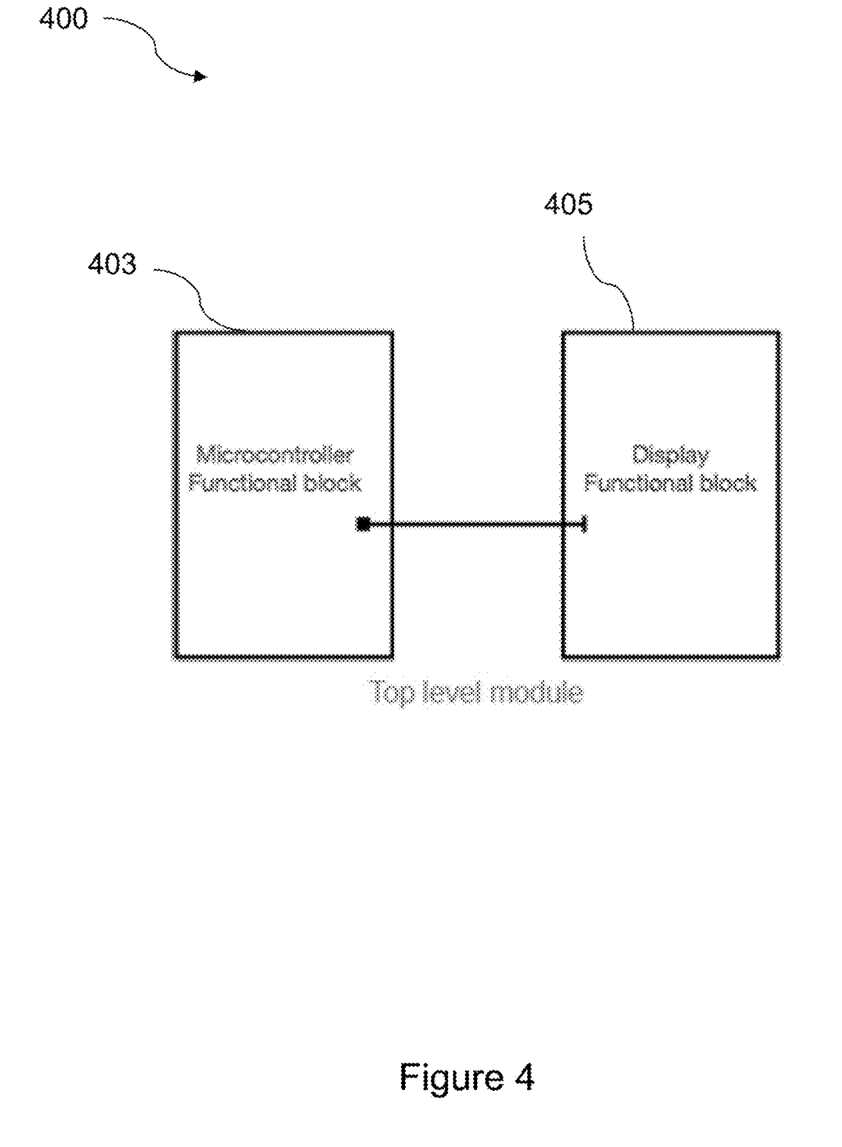
FIG. 4 shows a functional block diagram of a portion of another example electronic circuit.

In FIG. 4, it can be seen that in this simple example 400 the user wants a microcontroller functional block 403 coupled to a display functional block 405. When this input is fed into the computer program, when the computer program seeks to obtain candidate electronic parts, for example based on a lookup in a database such as database 105 described above with reference to FIG. 1, it determines that the functionality of each part/functional block could actually be provided by a plurality of electronic parts. This could be because an engineer has ascribed that for the particular requirements that are being used to perform the lookup in the database, that actually the functionality and candidate electronic parts could be solved by a module, defined by plurality of candidate electronic parts or a particular arrangement of parts and connections therebetween. For example, if the lookup is performed based on the requirements, attributes matching or at least partially matching the requirements stored in the database provide the indication that the functionality and candidate electronic parts would be better solved by a module defined by a plurality of candidate electronic parts or a particular arrangement of parts and connections therebetween. This is illustrated more clearly in FIG. 5 as will be described below.

Figure 5:
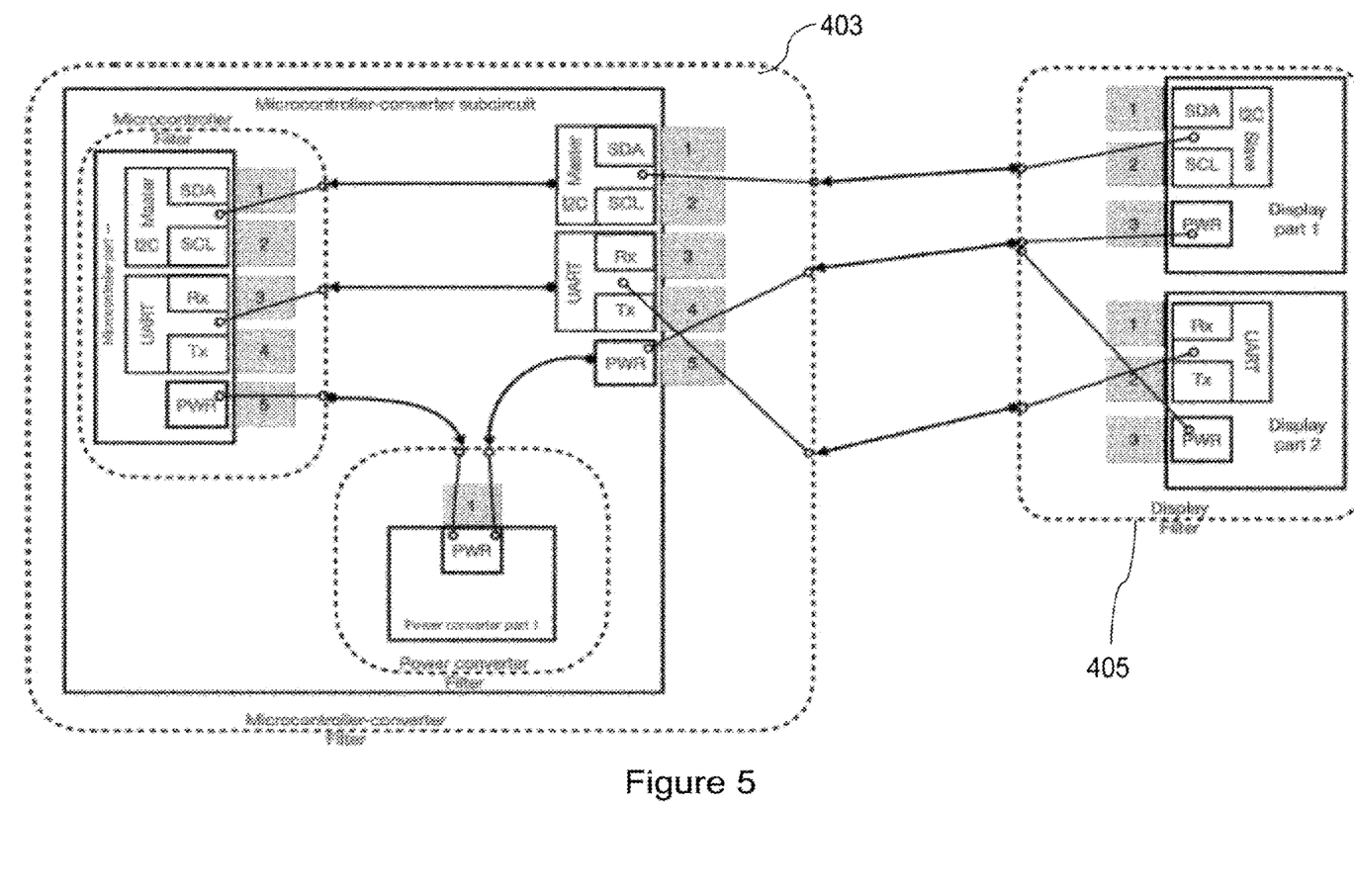
FIG. 5 shows a diagram illustrating filters with one of the filters populated by a subcircuit derived from the example electronic circuit of FIG. 4.

As can be seen in FIG. 5, the display functional block 405 converts into a filter with two display parts, and the microcontroller functional block 403 converts into a filter with one subcircuit—a microcontroller-converter subcircuit—with two filters—a microcontroller filter and a power converter filter. These are retrieved from a database where the composition of the module that is eventually converted into a subcircuit, has been defined by an engineer. In this case, the engineer has defined the module by specifying: a microcontroller functional block, a power converter functional block, an I2C Master interface on the module, a UART interface on the module, a power interface on the module, five pins, the possible pin mappings, as listed in the figure, a link from the I2C Master interface on the module to the microcontroller functional block, a link form the UART interface on the module to the microcontroller functional block, a link from the Power interface on the module to the power converter functional block, and a link from the microcontroller functional block to the power converter.

The subcircuit is created with a microcontroller filter corresponding the microcontroller functional block, a power converter filter corresponding to the power converter functional block and arcs from interfaces on the subcircuit to filters inside the subcircuit, and between filters in the subcircuit, all corresponding to the links defined in the module. The microcontroller functional block is populated by a single part, as is the power converter filter. Whilst the filters in this example are populated only with parts, it is possible that a filter in a subcircuit becomes populated by subcircuits as well as parts, if those subcircuits correspond to modules which fulfil the functional requirements of the functional block from which the containing filter is derived.

In some examples, outputting at least one designed electronic circuit schematic that meets the requirements of the functional representation comprises outputting a plurality of designed electronic circuit schematic that meet the requirements of the functional representation. Furthermore, if an objective function is specified, it is taken into account when determining the values of the variables of all the outputted circuits.

As noted above, in some examples the set of constraints may be based on user priorities. For example, the set of constraints may comprise a user-inputted specification for at least one of the electronic parts. For example, price could be the main consideration of the user; they want to build the cheapest electronic circuit possible.

In some examples the user may specify specific requirements for the electronic circuit, a portion of it, or the electronic part. These specific requirements may be received by the computer program. Determining a plurality of different candidate circuits by performing a lookup in a database may comprise determining which electronic parts meet the specific requirements based on data obtained from the database.

Figure 6:
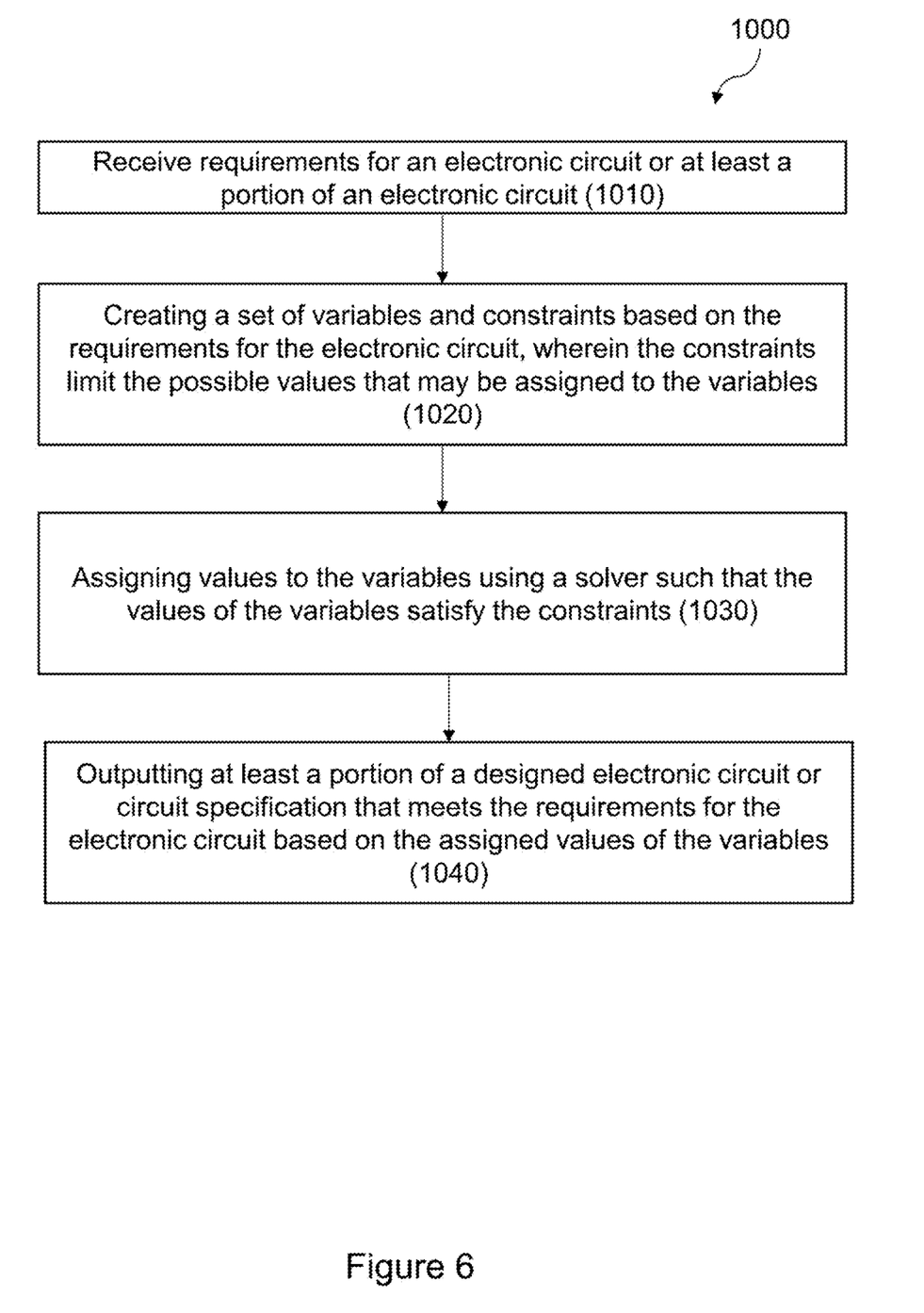
FIG. 6 shows an example process flow chart for an example computer-implemented method of designing at least a portion of an electronic circuit.

FIG. 6 shows an example process flow chart for an example computer-implemented method of designing at least a portion of an electronic circuit schematic. The method 1000 comprises the steps of receiving requirements for an electronic circuit schematic or at least a portion of an electronic circuit schematic (1010), creating a set of variables and constraints based on the requirements for the electronic circuit, wherein the constraints limit the possible values that may be assigned to the variables (1020), assigning values to the variables using a solver such that the values of the variables satisfy the constraints (1030), and outputting at least a portion of a designed electronic circuit schematic or circuit schematic specification that meets the requirements for the electronic circuit based on the assigned values of the variables (1040).

Figure 7:
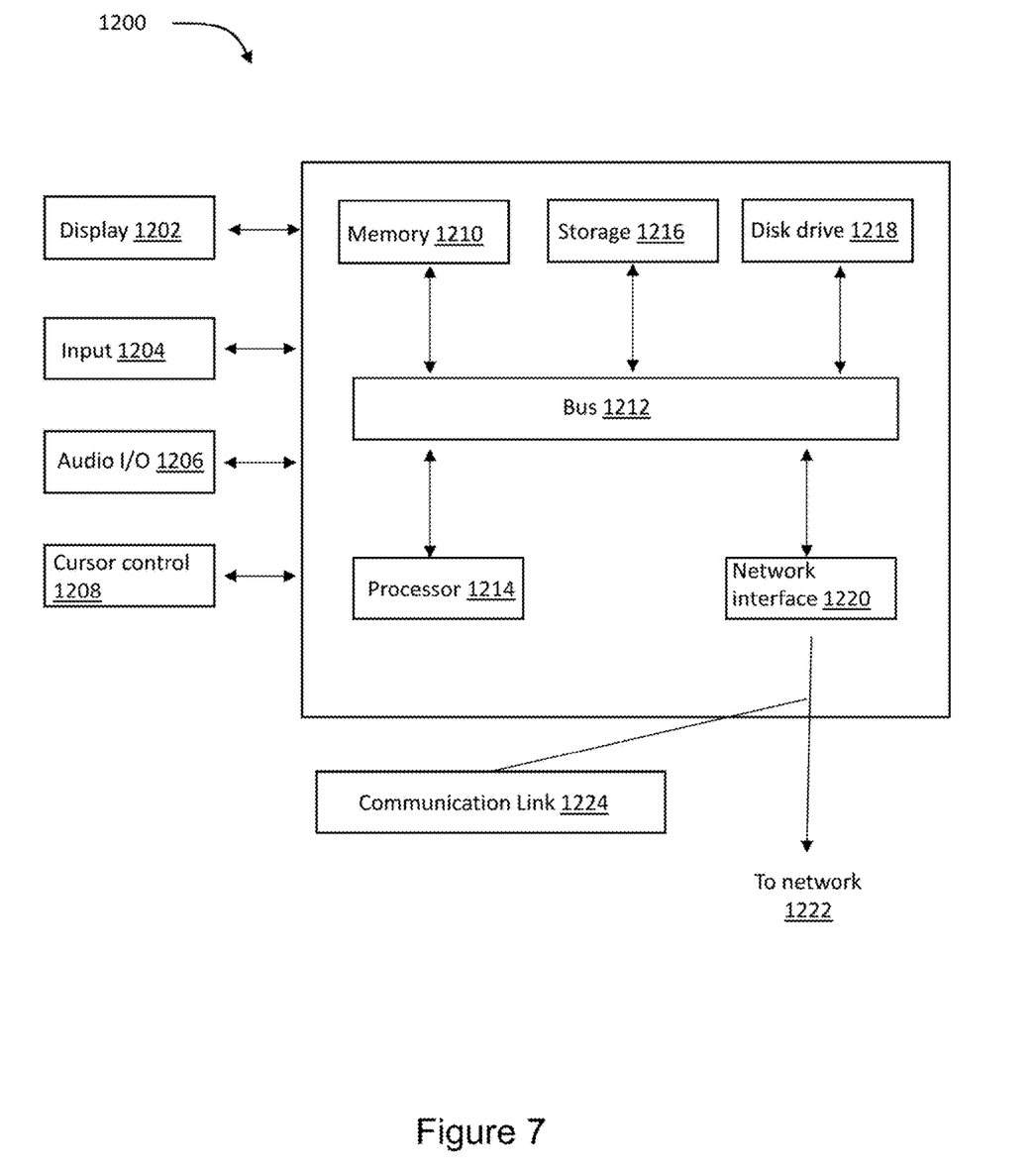
FIG. 7 shows a functional block diagram of a computer system suitable for implementing one or more embodiments of the present disclosure.

FIG. 7 is a block diagram of a computer system 1200 suitable for implementing one or more embodiments of the present disclosure, including the computer program described above with reference to FIGS. 1 to 6.

The computer system 1200 includes a bus 1212 or other communication mechanism for communicating information data, signals, and information between various components of the computer system 1200. The components include an input/output (I/O) component 1204 that processes a user (i.e., sender, recipient, service provider) action, such as selecting keys from a keypad/keyboard, selecting one or more buttons or links, etc., and sends a corresponding signal to the bus 1212. It may also include a camera for obtaining image data. The I/O component 1204 may also include an output component, such as a display 1202 and a cursor control 1208 (such as a keyboard, keypad, mouse, etc.). The display 1202 may be configured to present a user interface for designing an electronic circuit or a portion thereof as described above with reference to the user input of FIG. 1. An optional audio input/output component 1206 may also be included to allow a user to use voice for inputting information by converting audio signals. The audio I/O component 1206 may allow the user to hear audio. A transceiver or network interface 1220 transmits and receives signals between the computer system 1200 and other devices, such as another user device, or a remote device that may provide the functionality of a database such as database 105 described above with reference to FIG. 1 (for example containing template constraints, variables and/or objection function) via network 1222. In one example, the transmission is wireless, although other transmission mediums and methods may also be suitable. A processor 1214, which can be a microcontroller, digital signal processor (DSP), or other processing component, processes these various signals, such as for display on the computer system 1200 or transmission to other devices via a communication link 1224. The processor 1214 may also control transmission of information, such as cookies or IP addresses, to other devices.

The components of the computer system 1200 also include a system memory component 1210 (e.g., RAM), a static storage component 1216 (e.g., ROM), and/or a disk drive 1218 (e.g., a solid-state drive, a hard drive). The computer system 1200 performs specific operations by the processor 1214 and other components by executing one or more sequences of instructions contained in the system memory component 1210. For example, the processor 1214 can run the applications 200, 500 described above.

It will also be understood that the functionality of the computer program may be implemented in software or hardware, for example as dedicated circuitry. For example, it may be implemented as part of a computer system. The computer system may include a bus or other communication mechanism for communicating information data, signals, and information between various components of the computer system. The components may include an input/output (I/O) component that processes a user (i.e., sender, recipient, service provider) action, such as selecting keys from a keypad/keyboard, selecting one or more buttons or links, etc., and sends a corresponding signal to the bus. The I/O component may also include an output component, such as a display and a cursor control (such as a keyboard, keypad, mouse, etc.). A transceiver or network interface may transmit and receive signals between the computer system and other devices, such as another user device or a remote server via a network. In one embodiment, the transmission is wireless, although other transmission mediums and methods may also be suitable. A processor, which can be a microcontroller, digital signal processor (DSP), or other processing component, processes these various signals, such as for display on the computer system or transmission to other devices via a communication link. The processor may also control transmission of information, such as cookies or IP addresses, to other devices.

The components of the computer system may also include a system memory component (e.g., RAM), a static storage component (e.g., ROM), and/or a disk drive (e.g., a solid-state drive, a hard drive). The computer system performs specific operations by the processor and other components by executing one or more sequences of instructions contained in the system memory component.

Logic may be encoded in a computer readable medium, which may refer to any medium that participates in providing instructions to a processor for execution. Such a medium may take many forms, including but not limited to, non-volatile media, volatile media, and transmission media. In various implementations, non-volatile media includes optical or magnetic disks, volatile media includes dynamic memory, such as a system memory component, and transmission media includes coaxial cables, copper wire, and fibre optics. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by a computer system. In various other embodiments of the present disclosure, a plurality of computer systems 600 coupled by a communication link to a network (e.g., such as a LAN, WLAN, PTSN, and/or various other wired or wireless networks, including telecommunications, mobile, and cellular phone networks) may perform instruction sequences to practice the present disclosure in coordination with one another.

It will also be understood that aspects of the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

It will be appreciated that while a computer-implemented method of designing an electronic circuit schematic has been described, in some examples the method may further comprise manufacturing an electronic circuit according to the method. For example, the computer-implemented method may further comprise the step of sending instructions to manufacture an electronic circuit according to the designed schematic, for example to a remote device.

It will be appreciated from the discussion above that the embodiments shown in the Figures are merely exemplary, and include features which may be generalised, removed or replaced as described herein and as set out in the claims. In the context of the present disclosure other examples and variations of the apparatus and methods described herein will be apparent to a person of skill in the art.

The invention claimed is:

1. A computer-implemented method of designing at least a portion of an electronic circuit schematic, the method comprising:

receiving requirements for at least a portion of electronic circuit;

obtaining desired functionality of the at least a portion of electronic circuit from the requirements;

obtaining candidate electronic parts from a library of electronic parts that may provide the desired functionality;

creating a set of variables and constraints based on the requirements, wherein the constraints limit the possible values that may be assigned to the variables, wherein:
 a set of variables and constraints for the candidate electronic parts is created;
 a variable of the set of variables and constraints is ascribed to each candidate electronic part;
 an objective function of the variables is created;

assigning values to the variables using a solver such that the values of the variables satisfy the constraints; wherein assigning values to the variables using a solver comprises assigning values to the variables to optimise the value of the objective function, whilst satisfying the constraints; and outputting at least a portion of a designed electronic circuit schematic that meets the requirements for the at least a portion of electronic circuit based on the assigned values of the variables.

2. The computer implemented method of claim 1, wherein assigning values to the variables using a solver comprises determining whether the candidate electronic parts are possible based on the created constraints and variables.

3. The computer implemented method of claim 1 wherein in the event that no values can be assigned to all the variables such that the constraints are satisfied the method comprises outputting an indication that no solution is possible.

4. The computer implemented method of claim 1 wherein obtaining candidate electronic parts comprises:
 creating data structures representing at least one of (i) the candidate electronic parts, (ii) at least a subset of the candidate electronic parts and (iii) connections between the candidate electronic parts; and
 wherein creating a set of variables and constraints are based on the created data structures.

5. The computer implemented method of claim 4 wherein creating data structures representing at least one of (i) the candidate electronic parts, (ii) at least a subset of the candidate electronic parts, and (iii) connections between the candidate electronic parts comprises:
 generating respective filters based on the desired functionality,
 populating each filter with at least one of the candidate electronic parts; and
 creating arcs between filters to represent potential connections between the candidate electronic parts.

6. The computer implemented method of claim 5, wherein creating a set of variables and constraints comprises ascribing a variable to each arc, and assigning a value to the variable such that the constraints are satisfied.

7. The computer implemented method of claim 1 wherein creating a set of variables and constraints is based on at least one of (i) template variables, (ii) template constraints, and (iii) a template objective function.

8. The computer implemented method of claim 1 wherein obtaining candidate electronic parts comprises determining functional requirements of the at least a portion of electronic circuit, and mapping candidate electronic parts to the functional requirements.

9. The computer implemented method of claim 8 wherein mapping candidate electronic parts to the functional requirements comprises performing a lookup in a database to determine candidate electronic parts from a library of electronic parts based on at least one attribute obtained from the database.

10. The computer implemented method of claim 9 wherein the at least one attribute obtained from the database comprise at least one of:
 a category of the electronic part based on its functionality;
 possible connections of the electronic part;
 the number and type of physical pins per electronic part;
 the power demand or output of electronic parts;
 user priorities; and
 the communication interface for specific pins of specific electronic parts.

11. The computer implemented method of claim 1 wherein the objective function is configured to take into account user priorities.

12. The computer implemented method of claim 11 wherein the user priorities comprise at least one of:
 cost;
 reliability;
 size;
 tolerance;
 availability; and
 efficiency.

13. The computer implemented method of claim 1 wherein the set of variables and constraints comprises a set of rules defining the possible relationships and connections between the candidate electronic parts.

14. The computer implemented method of claim 1 wherein obtaining candidate electronic parts comprises determining that the desired functionality is provided by a plurality of the candidate electronic parts, and wherein obtaining candidate electronic parts comprises converting the at least a portion of electronic circuit into a plurality of subcircuits.

15. The computer-implemented method of claim 14 wherein the subcircuits are determined from the at least a portion of electronic circuit being a module or subsystem comprised of functional, architectural and non-functional requirements specified in at least one of (i) the candidate electronic parts and (ii) the requirements, the computer-implemented method further comprising determining at least one of (i) interfaces, and (ii) arcs based on the candidate electronic parts and the requirements.

16. The computer-implemented method of claim 15 wherein subcircuits are recursively constructed from candidate electronic parts that are modules or subsystems.

17. A computer readable non-transitory storage medium comprising a program for a computer configured to cause a processor to perform the method according to claim 1.

* * * * *